United States Patent
Woo

(10) Patent No.: US 8,074,238 B2
(45) Date of Patent: Dec. 6, 2011

(54) SPINDLE MOTOR

(75) Inventor: Joon Keun Woo, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 521 days.

(21) Appl. No.: 12/330,057

(22) Filed: Dec. 8, 2008

(65) Prior Publication Data

US 2009/0150915 A1    Jun. 11, 2009

(30) Foreign Application Priority Data

Dec. 6, 2007  (KR) .................. 10-2007-0125944

(51) Int. Cl.
*G11B 19/20*    (2006.01)
(52) U.S. Cl. .................. 720/702; 720/695; 720/705
(58) Field of Classification Search .................. 720/702
See application file for complete search history.

(56) References Cited

U.S. PATENT DOCUMENTS

| | | | |
|---|---|---|---|
| 7,002,268 B2 * | 2/2006 | Nagatsuka | 310/67 R |
| 7,434,240 B2 * | 10/2008 | Yoo et al. | 720/702 |
| 7,911,092 B2 * | 3/2011 | Kim | 310/67 R |
| 2007/0290571 A1 * | 12/2007 | Yoon | 310/261 |
| 2009/0009016 A1 * | 1/2009 | Kim | 310/90 |

FOREIGN PATENT DOCUMENTS

| KR | 10-2002-0049066 A | 6/2002 |
|---|---|---|
| KR | 10-2009-0059216 A | 6/2009 |

* cited by examiner

*Primary Examiner* — Son Mai
(74) *Attorney, Agent, or Firm* — Saliwanchik, Lloyd & Eisenschenk

(57) ABSTRACT

Provided is a spindle motor. The spindle motor includes a rotatable shaft, a stator, a rotor, and a turntable. The stator is positioned around the shaft. The rotor includes a rotor yoke coupled to the shaft. The rotor is rotated with the shaft integratedly by a reaction with the stator. The turntable is coupled to the shaft. The rotor yoke and the turntable are coupled to each other and are fixed to the shaft.

19 Claims, 1 Drawing Sheet

SPINDLE MOTOR

CROSS-REFERENCE TO RELATED APPLICATION

The present application claims the benefit under 35 U.S.C. §119(e) of Korean Patent Application No. 10-2007-0125944, filed Dec. 6, 2007, which is hereby incorporated by reference in its entirety.

BACKGROUND

The present disclosure relates to a spindle motor.

A spindle motor is used to rotate a disk to allow an optical pickup to read data recorded in the disk.

The spindle motor includes a rotor yoke coupled to a shaft. A disk can be rotated by loading the disk on the upper side of the rotor yoke.

BRIEF SUMMARY

Embodiments provide a spindle motor.

Embodiments also provide a spindle motor in which a turntable and a rotor yoke can be precisely coupled to desired positions of a shaft.

In one embodiment, a spindle motor includes: a rotatable shaft; a stator positioned around the shaft; a rotor including a rotor yoke coupled to the shaft, the rotor rotated with the shaft integratedly by a reaction with the stator; and a turntable coupled to the shaft, wherein the rotor yoke and the turntable are coupled to each other and are fixed to the shaft.

In another embodiment, a spindle motor includes: a base; a bearing housing installed at the base; a bearing fixed to the bearing housing; a shaft rotatably supported by the bearing; a stator around the bearing housing; a rotor including a rotor yoke coupled to the shaft and a magnet coupled to the rotor yoke; and a turntable coupled to the shaft, wherein the rotor yoke includes a coupling tube protruding toward the turntable and fixed to the shaft, and the turntable includes a coupling hole fixed to an outer surface of the coupling tube.

The details of one or more embodiments are set forth in the accompanying drawings and the description below. Other features will be apparent from the description and drawings, and from the claims.

DETAILED DESCRIPTION

Figure 1:
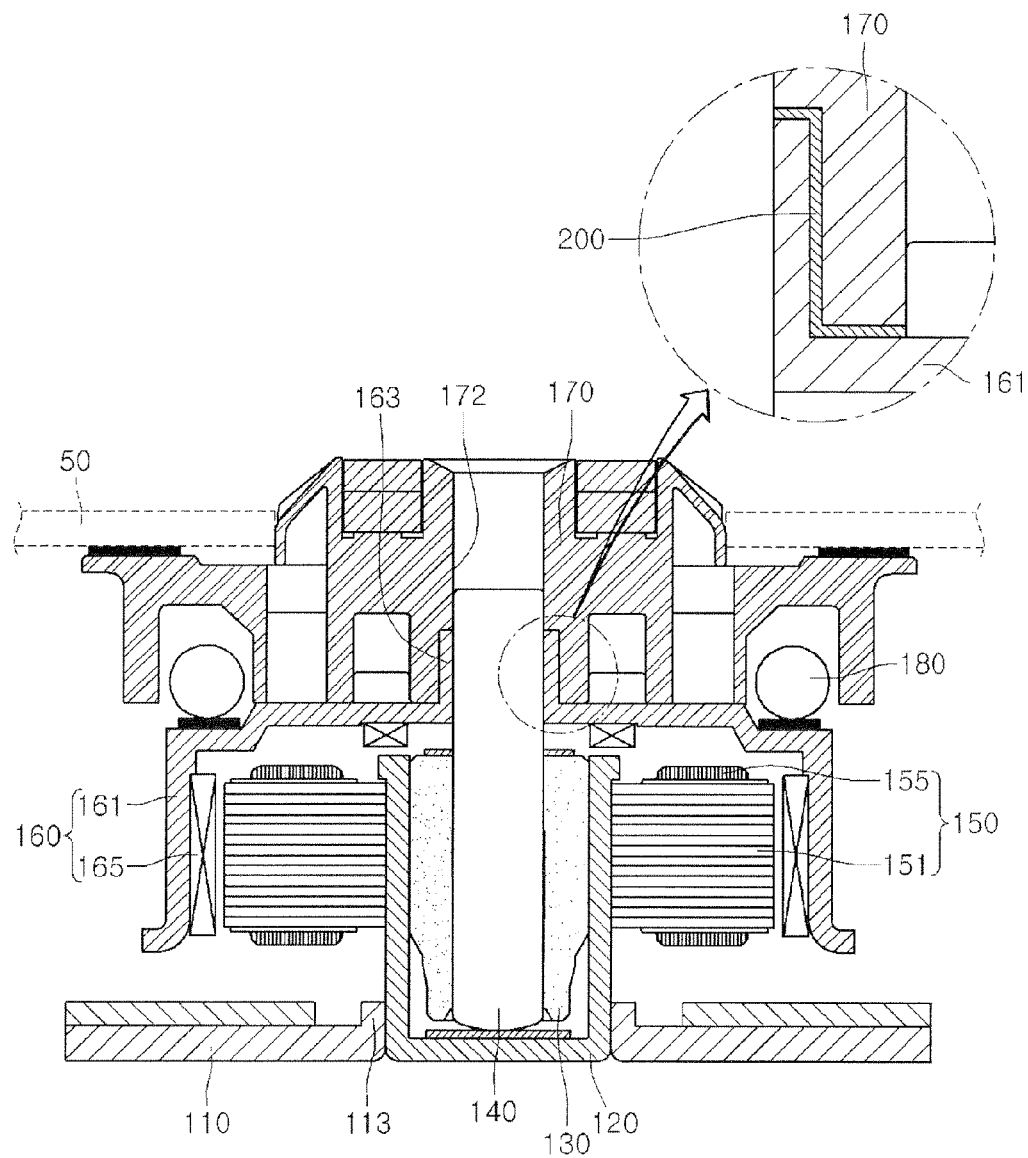
FIG. 1 is a cross-sectional view illustrating a spindle motor according to an embodiment.

A spindle motor will now be described in detail with reference to the accompanying drawing, in which an exemplary embodiment is shown.

FIG. 1 is a cross-sectional view illustrating a spindle motor according to an embodiment.

Referring to FIG. 1, a bearing housing 120 is vertically erected on a base 110.

The base 110 includes a burring part 113 protruding upward from the base 110, and the bearing housing 120 is fixed to the inner surface of the burring part 113 using an adhesive. The burring part 113 has a cylindrical shape with an opened upper side.

A bearing 130 is fixed to the inside of the bearing housing 120 by press fitting. A lower portion of a shaft 140 is rotatably supported by the bearing 130.

A thrust plate may be disposed inside the bearing housing 120 to support a lower end of the shaft 140 for reducing noise and friction.

A stator 150 and a rotor 160 are coupled to the bearing housing 120 and the shaft 140, respectively.

The stator 150 includes a core 151 coupled to an outer surface of the bearing housing 120, and a coil 155 wound around the core 151. The stator 150 may be disposed around the bearing housing 120 and supported by the base 110.

An upper portion of the bearing housing 120 is projected radially outward. The upper portion of the bearing housing 120 guides the stator 150 to be positioned properly.

The rotor 160 includes a rotor yoke 161 exposed to the outside of the bearing housing 120 and supported by the shaft 140, and a ring-shaped magnet 165 coupled to the rotor yoke 161 and facing the stator 150.

Therefore, when a current is applied to the coil 155, the rotor 160 and the shaft 140 are rotated by an electromagnetic force generated between the coil 155 and the magnet 165.

A turntable 170 is disposed at the upper side of the rotor yoke 161. The turntable 170 is coupled to the shaft 140 and is rotated together with the shaft 140. A disk 50 is loaded on the turntable 170.

Balls 180 may be disposed between the rotor yoke 161 and the turntable 170 to reduce vibration caused by eccentricity. An upper side of the rotor yoke 161 includes a lower portion and a upper portion, and the balls 180 are disposed on the lower portion.

In the spindle motor of the current embodiment, the rotor yoke 161 and the turntable 170 are coupled to each other and fixed to the shaft 140 using an adhesive. In FIG. 1, an example of the rotor yoke 161 coupled to the turntable 170 by an adhesive 200 is shown.

A coupling hole 172 is formed in a center portion of the turntable 170, and a coupling tube 163 is disposed at a center portion of the rotor yoke 161. The outer surface of the coupling tube 163 is fixed to the coupling hole 172 by press fitting or using an adhesive.

The coupling hole 172 has a first diameter and a second diameter. In detail, an upper portion of the coupling hole 172 has a first diameter, and a lower portion of the coupling hole 172 has a second diameter larger than the first diameter.

The coupling tube 163 protrudes upward from the rotor yoke 161 toward the turntable 170, and the inner diameter of the coupling tube 163 is equal to the first diameter of the coupling hole 172. The outer diameter of the coupling tube 163 is equal to the second diameter of the coupling hole 172.

The inner surfaces of the coupling tube 163 and the coupling hole 172 are fixed to the shaft 140 by an adhesive. Since the rotor yoke 161 and the turntable 170 are fixed to the shaft 140 by an adhesive, the rotor yoke 161 and the turntable 170 can be precisely placed at a desired position of the shaft 140.

If the rotor yoke 161 and the turntable 170 are fixed by press fitting, the rotor yoke 161 and the turntable 170 may be deformed during the press fitting process, or the position of the rotor yoke 161 and the turntable 170 may be re-adjusted after the press fitting process.

However, in the spindle motor of the current embodiment, the rotor yoke 161 and the turntable 170 coupled to each other are coupled to the shaft 140 by using an adhesive so that the rotor yoke 161 and the turntable 170 can be precisely placed at a desired position of the shaft 140 through a simple assembling process.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A spindle motor comprising:
   a rotatable shaft;
   a stator positioned around the shaft;
   a rotor comprising a rotor yoke coupled to the shaft, the rotor rotated with the shaft integratedly by a reaction with the stator; and
   a turntable coupled to the shaft, wherein the turntable is configured to receive a disk loaded on an upper surface of the turntable,
   wherein the turntable includes a space,
   wherein a ball is disposed in the space to reduce vibration, and
   wherein the rotor yoke and the turntable are coupled to each other by an adhesive and are fixed to the shaft.

2. The spindle motor according to claim 1, wherein the turntable comprises a coupling hole, wherein a portion of an inner surface of the coupling hole is fixed to an outer surface of the shaft and another portion of the inner surface of the coupling hole is coupled to the rotor yoke, and
   the rotor yoke comprises a coupling tube, wherein an inner surface of the coupling tube is fixed to the outer surface of the shaft and an outer surface of the coupling tube is coupled to the another portion of the inner surface of the coupling hole.

3. The spindle motor according to claim 2, wherein the coupling hole has a first diameter and a second diameter greater than the first diameter, and wherein the coupling tube has an inner diameter equal to the first diameter and an outer diameter equal to the second diameter.

4. The spindle motor according to claim 1, wherein the rotor yoke and the turntable are bonded to the shaft.

5. A spindle motor comprising:
   a base;
   a bearing housing installed at the base;
   a bearing fixed to an inside of the bearing housing;
   a shaft rotatably supported by the bearing;
   a stator around the bearing housing;
   a rotor comprising a rotor yoke coupled to the shaft and a magnet coupled to the rotor yoke; and
   a turntable coupled to the shaft,
   wherein the rotor yoke comprises a coupling tube protruding toward the turntable and fixed to the shaft, and the turntable comprises a coupling hole fixed to an outer surface of the coupling tube,
   wherein an upper portion of the bearing housing is projected radially outward to guide the stator.

6. The spindle motor according to claim 5, wherein at least portions of the coupling tube and the coupling hole are overlapped with each other in a horizontal direction.

7. The spindle motor according to claim 5, further comprising a ball disposed between the rotor yoke and the turntable.

8. The spindle motor according to claim 7, wherein an upper side of the rotor yoke includes a lower portion and an upper portion, and wherein the ball is disposed on the lower portion.

9. The spindle motor according to claim 5, wherein the coupling hole is fixed to the shaft using an adhesive.

10. The spindle motor according to claim 5, wherein top and lateral surfaces of the coupling tube are in contact with the turntable.

11. The spindle motor according to claim 5, wherein the rotor yoke and the turntable are fixed to each other by press fitting or using an adhesive, and the rotor yoke and the turntable are bonded to the shaft.

12. A spindle motor comprising:
    a base;
    a bearing housing installed at the base;
    a bearing fixed to an inside of the bearing housing;
    a shaft rotatably supported by the bearing;
    a stator around the bearing housing;
    a rotor comprising a rotor yoke coupled to the shaft and a magnet coupled to the rotor yoke; and
    a turntable coupled to the shaft, wherein the turntable includes a space, and wherein a ball is disposed in the space to reduce vibration,
    wherein the turntable is directly fixed to the shaft,
    wherein the rotor yoke is directly fixed to the shaft, and
    wherein the turntable and the rotor yoke are directly fixed to each other by an adhesive.

13. The spindle motor according to claim 12, wherein the rotor yoke comprises a coupling tube fixed to the shaft.

14. The spindle motor according to claim 13, wherein the coupling tube is protruded toward the turntable.

15. The spindle motor according to claim 14, wherein the turntable comprises a coupling hole fixed to an outer surface of the coupling tube.

16. The spindle motor according to claim 15, wherein at least portions of the coupling tube and the coupling hole are overlapped with each other in a horizontal direction.

17. The spindle motor according to claim 14, wherein top and lateral surfaces of the coupling tube are in contact with the turntable.

18. The spindle motor according to claim 12, wherein an upper surface of a portion of the rotor yoke is flat,
    wherein a lower surface of a portion of the turntable is flat,
    wherein the upper surface of the portion of the rotor yoke is faced with the lower surface of the portion of the turntable, and
    wherein the adhesive is disposed between the upper surface of the portion of the rotor yoke and the lower surface of the portion of the turntable.

19. The spindle motor according to claim 18, wherein the upper surface of the portion of the rotor yoke and the lower surface of the portion of the turntable are parallel to an upper surface of the base.

* * * * *